United States Patent [19]
Colley

[11] Patent Number: 4,517,439
[45] Date of Patent: May 14, 1985

[54] AC-DC WELDING POWER SUPPLY

[76] Inventor: Bruce H. Colley, 205 Teal Ct., Benicia, Calif. 94510

[21] Appl. No.: 607,862

[22] Filed: May 7, 1984

[51] Int. Cl.³ .............................................. B23K 9/10
[52] U.S. Cl. ........................... 219/130.33; 219/130.4; 219/137 PS; 323/262
[58] Field of Search .......... 219/130.1, 130.21, 130.31, 219/130.32, 130.33, 137 PS, 130.4; 323/251, 255, 257, 262, 263

[56] References Cited

U.S. PATENT DOCUMENTS

| | | | |
|---|---|---|---|
| 3,278,833 | 10/1966 | Owen | 219/130.1 |
| 3,356,928 | 12/1967 | Parrish . | |
| 3,539,358 | 9/1970 | Grist . | |
| 3,549,979 | 12/1970 | Stearns et al. . | |
| 3,684,942 | 8/1972 | Pettit, Jr. et al. . | |
| 3,688,180 | 8/1972 | Chinsson et al. . | |
| 3,780,258 | 12/1973 | Iceland et al. . | |
| 3,781,508 | 12/1973 | Dauer et al. . | |
| 3,781,640 | 12/1973 | Toth . | |
| 3,896,287 | 7/1975 | Cook . | |
| 3,912,980 | 10/1975 | Crump et al. . | |
| 3,921,055 | 11/1975 | Dorsey | 219/130.1 |
| 3,995,137 | 11/1976 | Okada et al. | 323/262 |
| 4,123,646 | 10/1978 | Keinanen . | |
| 4,225,769 | 9/1980 | Wilkins . | |
| 4,282,569 | 8/1981 | Hardwick et al. . | |
| 4,345,139 | 8/1982 | Higgins . | |

OTHER PUBLICATIONS

*Welding Handbook*, 6th Ed., Section 2, edited by Arthur L. Phillips; published by American Welding Society, New York, New York.
*General Electric SCR Manual*, 6th Ed., 1979.

*Primary Examiner*—Clifford C. Shaw
*Attorney, Agent, or Firm*—Townsend & Townsend

[57] ABSTRACT

An AC-DC welding power supply includes a main transformer in which the primary windings are partially decoupled from the secondary windings to provide a small amount of reactance on the output side of the power supply. A current regulating circuit and a current sensing shunt are mounted between two or more secondary windings for isolation. The current regulating circuit is controlled by a firing control circuit. An adjustable output feedback control circuit, including the shunt and a mixing circuit, provides a mixed current/voltage signal to the firing control circuit according to the current through and voltage across the secondary windings. The power supply output is adjustable from constant voltage through constant current. The output terminals of the secondary windings are connected directly to AC supply terminals and also to DC supply terminals through a rectifier circuit. A minimum current secondary winding supplies a high voltage, low current signal which is superimposed on the low voltage, high current output from the secondary windings for arc maintenance. A safety switch senses the current passing through the inductor so that the higher voltage current from the minimum current winding is applied to the DC supply terminals only while welding.

18 Claims, 6 Drawing Figures

AC-DC WELDING POWER SUPPLY

BACKGROUND OF THE INVENTION

Most welding power supplies use alternating current as their source of electricity. For many applications, such as conventional arc welding, direct current at a reduced voltage is needed. Conversion of AC to DC is commonly done in one of several ways. One way is by the use of a stepped down isolation transformer coupled to the alternating current source, a rectifying bridge and a ripple smoothing inductance. For welding operations, it is often desirable to be able to provide a constant current over a range of operating voltages. In such constant current operation, the current versus voltage curve, in which current is plotted along the X axis and voltage along the Y axis, is close to vertical over the operating range only by starting out with a high open circuit voltage. Having this high open circuit voltage always present can be a safety hazard to the operator.

Silicon controlled rectifiers (SCRs) are now commonly used to rectify and control the alternating current. The use of SCRs allows the current versus voltage curve to be truly vertical over the operating range without the need for a high open circuit voltage. This is made possible by using feedback circuitry, which senses the current flow through the electrode, in conjunction with the ability of the SCRs to conduct over only a part of each alternating current cycle. As the arc resistance varies, more or less of the alternating current is chopped (also called phased back) by the SCRs to achieve a constant average current level.

In standard welding applications, the arc voltage is relatively low, such as 20–40 volts. However, to keep the arc ionized it is necessary to apply an arc sustaining, high voltage, low current signal on top of the low voltage, high current output of the power supply. This can be accomplished using separate rectifier assemblies such as shown in U.S. Pat. No. 3,356,928 to Parrish.

To achieve something close to constant current output from alternating current power supplies, transformers, in which one of the windings is movable to change the reactive coupling between the primary and secondary windings, have been used. One problem with this type of control is that current adjustment is mechanical and therefore cumbersome and slow and not readily adaptable to feedback control.

A serious drawback with conventional low open circuit voltage power supplies is their lack of adequate short circuit protection. Short circuiting of a power supply can come about in several ways. In some welding processes, the arc is initiated by touching the electrode to the work piece, thereby creating a short circuit until the arc is struck. The transfer of molten metal from the electrode to the work piece also causes momentary short circuits during the process. Short circuiting of the power supply can occur accidentally by inadvertent connection of the output terminals. This may result from the output leads touching, a tool dropping on the output studs, or other such inadvertent means. Short circuiting may also occur in various testing or evaluation procedures. For example, Underwriters Laboratories approval of a welding power supply requires that it pass a short circuiting test.

In a constant current silicon controlled rectifier power supply using feedback control to maintain the current at a constant level, a short circuiting condition can present a very severe operating condition for the SCRs. With the arc voltage at essentially 0 volts (short circuit), the SCRs must phase back to the point where the voltage across the SCRs is equal to the voltage from the secondary of the transformer. Using conventional closely coupled transformers, the voltage across the SCRs will be close to the open circuit voltage of the transformer secondary, reduced only by the voltage drop caused by impedances of the transformer, input line, and wiring and components in the power supply itself. As a result, the SCRs must phase back to a very low conduction angle. At this low conduction angle they must be capable of handling the current that is required by the setting of the current control on the constant current power supply, possibly the maximum possible power supply output. The result is that the SCRs may see virtual current spikes, which have an average value that is within the rating of the SCRs but which have an RMS value which may exceed the rating of the SCRs. Using other terminology, the "form factor," which is defined as the ratio of the RMS value of a waveform to its average value, increases as the SCR conduction angle decreases. The form factor represents a convenient method of analysis of SCR capability. In the extreme, constant DC has a form factor of 1.0. A waveform representing a spike that approaches a zero time interval has a form factor that approaches infinity. For an SCR of a given average current rating, its capability decreases as the form factor increases, given the same average current under both conditions.

Another problem which can affect the proper operation of power supplies arises from the effect of noise or other interference in the secondary circuit. Noise is a particular problem in AC welding where there is no inductor to help filter the noise. For example, in AC tungsten inert gas (TIG) welding, a high voltage, high frequency signal is superimposed on the arc to initiate, sustain and stabilize the arc. The interference from this signal can be extremely detrimental to the operation of the SCRs if not effectively filtered. Such high frequency interference can also affect the fire control circuit regulating the SCRs.

SUMMARY OF THE INVENTION

The present invention is directed to an AC-DC welding power supply in which a small amount of reactance is added to the output side of the power supply to minimize the effects of short circuiting.

The AC-DC welding power supply includes a main transformer having one or more primary windings and preferably two or more secondary windings. The primary windings are partially decoupled from the secondary windings to provide the small amount of reactance on the output side of the power supply.

The output of the power supply is regulated by a current regulating circuit connected to the secondary windings. A firing control circuit is connected to various points in the power supply and controls the operation of the current regulating circuit, typically including SCRs, to achieve the desired output characteristics.

A mixing circuit is connected to a current sensing shunt and across the secondaries and combines the resulting current and voltage level signals into a mixed signal. The proportion of the current and voltage signals can be varied to provide the firing control circuit with an adjustable mixed feedback signal according to the current flow through and voltage across the secondary windings. Thus the output of the power supply can be regulated at constant voltage, constant current or anywhere in between. The mixing circuit, shunt and associated connections are called the feedback circuit.

The current regulating circuit and the shunt are connected between the secondary windings to help isolate the SCRs and the firing control circuit from noise and other electrical interference. This is particularly important in AC TIG welding in which a high voltage, high frequency signal is applied to the arc. To further isolate the feedback circuit from interference which may be present in the main circuit, an isolation transformer is added in the feedback circuit between the shunt and the mixing circuit.

The output terminals of the secondary windings are connected directly to the AC supply terminals of the power supply. The secondary windings' output terminals are also connected to a rectifier circuit. The rectifier circuit provides rectified DC, which is smoothed out by an inductor, to the DC supply terminals of the power supply.

The main transformer secondary includes a minimum current winding which produces a high voltage, low current signal which is superimposed on the low voltage, high current output from the other secondary windings. This high voltage signal is used for arc maintenance. A normally open safety switch is used to isolate the minimum current secondary winding from the balance of the circuit until after welding operations have begun. The safety switch operates by closing only when it senses substantial current passing through the DC supply terminals; the high voltage current from the minimum current winding is thus applied to the DC supply terminals only after the DC welding process has commenced. Therefore, if the operator accidentally touches the supply terminals at other times, he or she will be subjected to the lower voltage from the secondary windings rather than the higher, more dangerous, voltage from the minimum current winding.

The significance of adding reactance to the AC side of the power supply is threefold. First, the reactance tends to be current limiting. Since in one mode the power supply of the invention is designed to regulate at a constant current, the conduction angle of the SCRs must increase to offset this current limiting effect. The increased conduction angle results in a lower form factor, which the allows the use of lower rated SCRs, as noted above. Second, the reactance tends to smooth or soften the current waveform. This also results in a markedly improved form factor, as well as an improved arc characteristic. Third, the added reactance results in an extended duration of the waveform. This improves the AC welding characteristics, as will be further explained below. The addition of a very slight amount of reactance entails insignificant cost but results in considerable savings due to reduced SCR rating requirements and in performance improvements as well.

Adding reactance, such as by decoupling the primary and secondary windings, which causes a reactive voltage drop equal to about 5% of the open circuit voltage, causes the open circuit voltage and therefore the transformer KVA to increase by only a negligible amount. However, adding such a small amount of reactance significantly decreases the form factor of the SCR waveform at the typical retard angles encountered in the operation of welding power supplies.

Furthermore, the smoothing or softening effect significantly improves welding characteristics for both AC and DC welding processes since it lessens the current spikes which cause performance to deteriorate. This smoothing effect reduces the amount of required inductance for a DC power supply, an economic advantage. The extended duration of the waveform is helpful in AC welding, as the AC arc tends to extinguish during the interval when the voltage across the load goes to zero. With the present invention, the minimum current circuit maintains this voltage under this condition. With the extended duration of the waveform of the main circuit, amount of minimum current required is reduced, thereby extending the output range of the machine to lower currents and also resulting in further economic benefits.

A further benefit of the added reactance occurs under short circuiting conditions upon turn-on of the power supply. Upon turn-on, there is a certain delay until the firing circuit stabilizes and regulates. If the unit is short circuited during this period, the SCRs must conduct the short circuit current in a current unregulated state. This current can be very high and can easily exceed the peak current rating for the SCRs. The addition of reactance limits this current to help alleviate the problem. Should the SCRs fail in a short circuited condition, the reactance will also serve to help to protect the transformer and other main circuit components from the higher currents that would otherwise occur.

Additional protection for certain short circuiting conditions can also be obtained through the addition of electronic circuitry to the firing circuit. Non-process unintentional short circuits, or short circuits which occur as part of a testing or evaluation procedure, are typically of much longer duration than the short circuits encountered during the welding process. The ability of SCRs to handle current surges decreases rapidly as a function of duration. The SCRs are protected against these non-process short circuits through the use of circuitry, incorporated into the firing circuit, which measures the current and phase angle. If certain conditions for both of these parameters are met for a predetermined duration, then the firing circuit will shut off the SCRs to protect them from the longer duration non-process short circuits.

Other features and advantages of the invention will appear from the following description in which the preferred embodiment has been set forth in detail in conjunction with the accompanying drawings.

DETAILED DESCRIPTION OF THE PREFERRED EMBODIMENT

Figure 1:
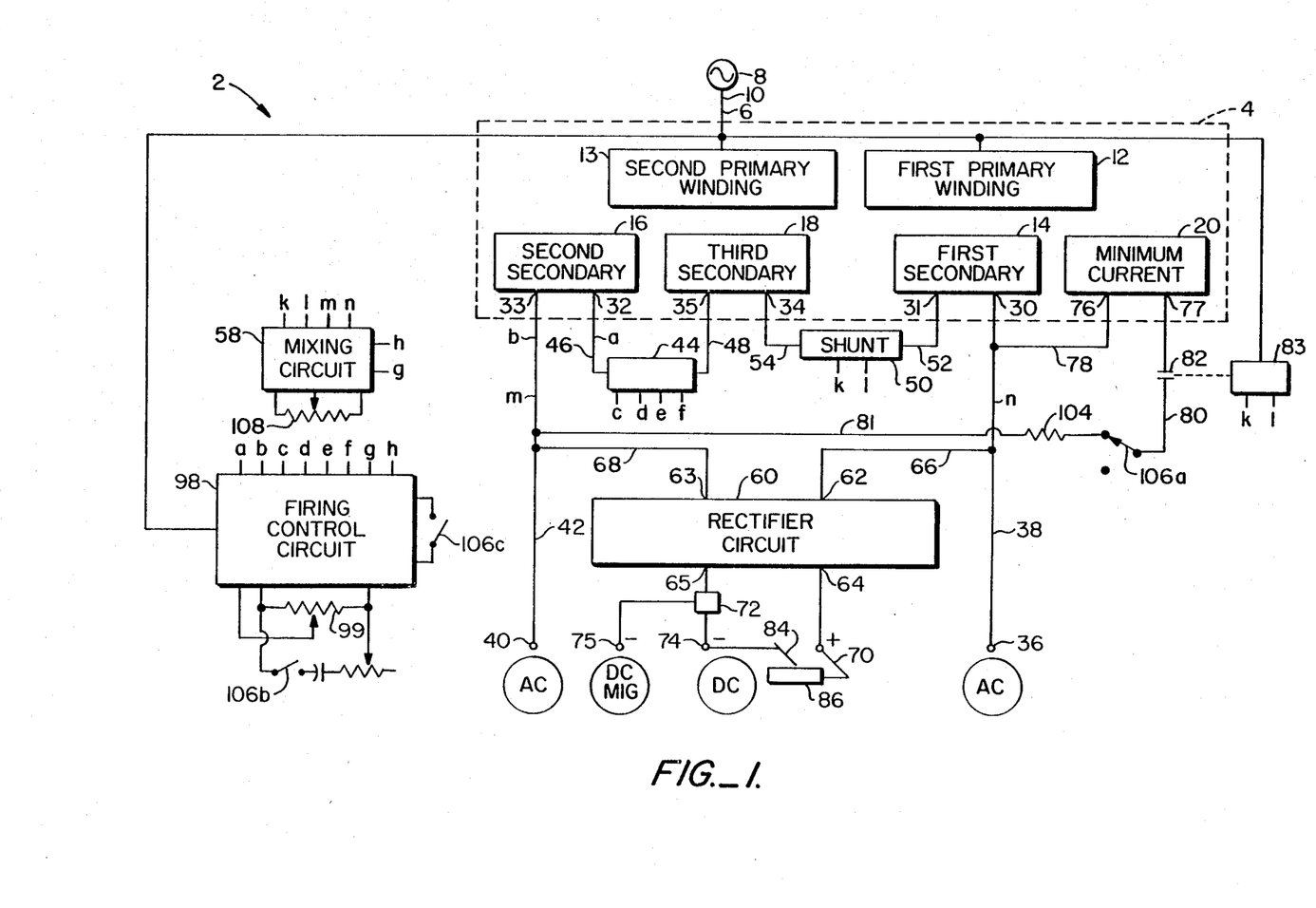
FIG. 1 is a block diagram of the power supply of the invention.
Figure 2:
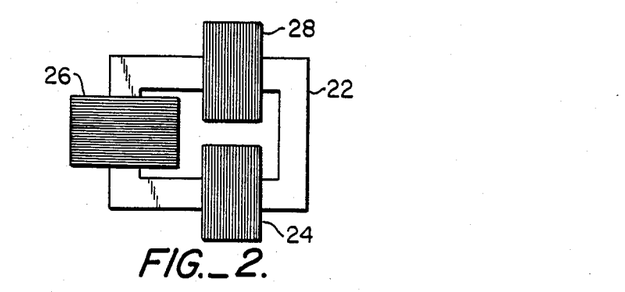
FIG. 2 shows the arrangement of the primary and secondary windings on the core of the transformer of FIG. 1.

Referring now to FIG. 1, an AC-DC power supply 2 is shown to include a main transformer 4 having a main input 6 connected to an AC supply 8 by line 10. Transformer 4 includes first and second primary windings 12, 13, first, second and third secondary windings 14, 16, and 18 and a minimum current secondary winding 20. All the windings are wrapped around a common core 22, as shown in FIG. 2, to form first, second and third coils 24, 26 and 28. First coil 24 includes first secondary winding 14 wound on top of first primary winding 12, while second coil 26 has third secondary winding 18 wound over second primary winding 13. Third coil 28 is made up of second secondary winding 16 and minimum current secondary winding 20. Second secondary winding 16 is partially decoupled from primary windings 12, 13 to provide a small amount of reactance to the secondary side of transformer 4 and thus to the output side of the power supply 2. The first and third secondary windings 14, 18 are wound on top of primary windings 12, 13 and are thus are closely coupled. By varying the ratio of turns between the decoupled secondary winding 16 and the closely coupled secondary windings 14, 18, the desired amount of reactance can be achieved.

First, second and third secondary windings 14, 16 and 18 include first and second output terminals 30–35, respectively. First output terminal 30 is connected to a first AC supply terminal 36 by a line 38. Second output terminal 33 of second secondary winding 16 is connected to a second AC supply terminal 40 by a line 42. Terminals 32 and 35 of second and third secondary windings 16, 18 are connected to one another through a current regulating circuit 44 by lines 46, 48. A low resistance shunt 50 is mounted between terminals 31 and 34 of first and third secondary windings 14, 18 by lines 52, 54.

A firing control circuit 98 monitors the circuit and controls the operation of circuit 44. Voltage and current feedback from lines 38, 42 and shunt 50 is provided circuit 98 through a mixing circuit 58. Mixing circuit 58 is also connected to lines 38 and 42 and is used to combine signals, representing the current through and voltage across the secondary windings, in different proportions so the output of power supply 2 can vary from constant current to constant voltage. The operation of shunt 52, mixing circuit 58 and associated lines, collectively termed the feedback circuit, is described in more detail below.

To provide DC power, supply 2 includes a rectifier circuit 60 having a pair of input terminals 62, 63 and a pair of output terminals 64, 65. Input terminals 62, 63 are connected to lines 38, 42 by lines 66, 68, respectively. Output terminal 65 is connected to a negative DC supply terminal 74 through a current smoothing inductor 72 while output terminal 64 is connected to a positive DC supply terminal 70. A second negative DC terminal 75 is connected to a tap along inductor 72. This provides DC at a lower inductance level, which is desirable for certain operations, such as metal inert gas (MIG) welding.

Secondary windings 14, 16, and 18 are used to supply lower voltage (for example 30 volts), high current output at either AC supply terminals 36, 40 or DC supply terminals 70, 74, 75. However, a higher voltage (for example 80 volts), low current signal can be superimposed upon the main output current by minimum current winding 20. This signal is necessary for many types of welding, such as to sustain the arc. Winding 20 has an output terminal 76 connected to line 38 by a line 78 and an output terminal 77 connected to line 42 by a line 80, a switch 106a, a resistor 104 and a line 81.

Switch 106a is generally connected to resistor 104 during constant current processes, for example during TIG and stick welding. Resistor 104 is sized so that minimum current winding 20 supplies current in the range of 2% to 10% of the power supply rated current. Switch 106a is opened to remove minimum current winding 20 from the circuit, typically for constant voltage welding such as MIG welding.

A normally open relay safety switch 82 is used along line 80 as a safety measure to control the flow of current from minimum current winding 20. Relay switch 82 is actuated by a safety circuit 83 which senses current flow through shunt 50. When an electrode 84 is first touched to the work surface 86, current begins to flow through the series connected secondary windings 14, 16 and 18, but not through minimum current winding 20 because switch 82 is open. As the current begins to flow through shunt 50, switch 82, under control of safety circuit 83, closes supplying the higher voltage current from minimum current winding 20 to lines 38, 42 (assuming switch 106a is closed). However, until the arc is struck, the voltage across terminals 70, 74 is the lower voltage (typically 20–40 volts) from secondary windings 14, 16 and 18 as regulated by circuit 44 under the control of circuit 98. Thus, before the arc is struck, the operator would be subjected to the lower voltage from secondary windings 14, 16, 18 if contact were made with, for example, the electrode 84 and the work piece 86 rather than the higher, and more dangerous, arc sustaining voltage from minimum current winding 20.

Figure 3:
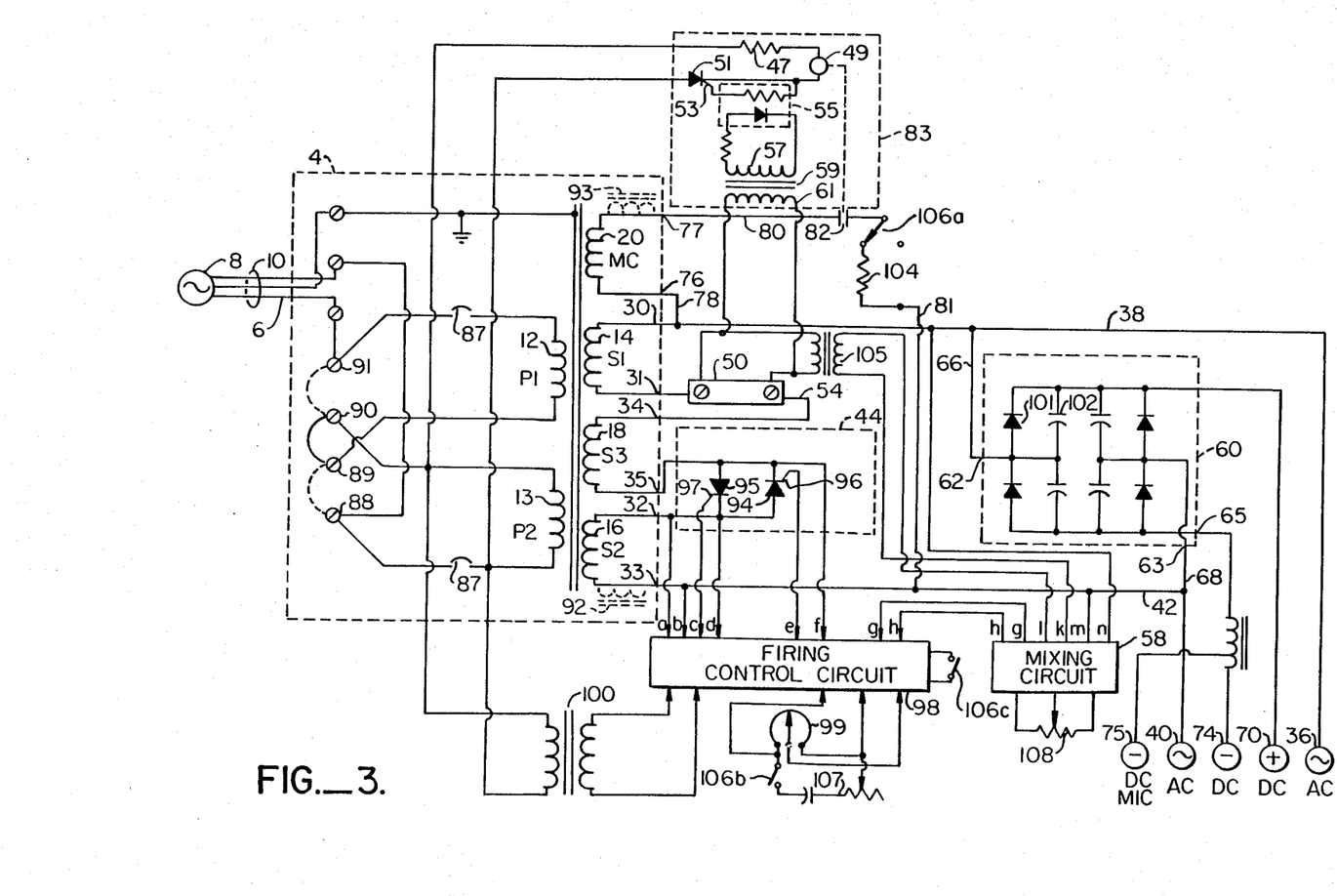
FIG. 3 is a detailed circuit diagram of the power supply of FIG. 1.

Referring now to FIG. 3, power supply 2 is shown in more detail. Main transformer 4 includes a number of terminal posts 88–91 connected according to whether AC source is, for example, a 115 volt or a 230 volt power source. If AC source 8 is a 115 volt source, terminals 88 and 89 are connected by jumpers and terminals 90 and 91 are connected by jumpers so that primary windings 12, 13 are connected in parallel to power source 8. This is shown by the curved dashed lines in the figure. If power source 8 is a 230 volt power source, terminal posts 89 and 90 are connected (as indicated by the curved solid line) by a jumper so primary windings 12, 13 are in series. In either event the voltage applied across primary windings 12, 13 would be the same, that is 115 volts. Other voltage power sources may be used as well. A pair of circuit breakers 87 limit the maximum current through primary windings 12, 13 and thus the current output of power supply 2.

The reactance produced by decoupling second and minimum current secondary windings 16, 20 from primary windings 12, 13 is indicated by inductors 92, 94 shown in dashed lines FIG. 3. Although in the preferred embodiment the reactive component has been achieved by the controlled decoupling of the primary and secondary windings, if desired a closely coupled transformer may be used and a separate inductive component added to the AC side of the power supply. However, the disclosed embodiment is preferred because of the additional cost of such additional components.

Current regulating circuit 44 includes a pair of SCRs 94, 95 connected between second and third secondary windings 16, 18. The gates 96, 97 of SCRs 94, 95 are connected to terminals e and c respectively of firing control circuit 98. An external variable resistor 99 is connected to firing control circuit 98 to control the current level output of power supply 2. Circuit 44 and shunt 50 are monitored by firing control circuit 98 through lines from terminals labeled d, f, g, and h. Winding 16 is monitored through lines connecting terminals a and b to output terminals 32, 33; the phase angle is monitored through these terminals for the short circuit protection in the constant current mode. Alternating current, regulated by circuit 44, is supplied to AC terminals 36, 40 directly from secondary windings 14, 16 and 18.

Safety circuit 83 includes a resistor 47, a relay 49 and an SCR 51 connected in series to terminal posts 88, 90 of main transformer 4. The gate 53 of SCR 51 is connected to a photocoupler 55 driven by the secondary winding 57 of a transformer 59. The primary winding 61 of transformer 59 is connected across shunt 50. Relay 49 is actuated to close switch 82 only when gate 53 of SCR 51 is supplied a signal from photocoupler 55. Photocoupler 55 is actuated only when current passes through shunt 50 so the higher voltage from minimum current winding 20 is supplied to lines 38, 42 only while current flows through shunt 50.

An R-C circuit 107 is connected across resistor 99 through a switch 106b for use as a burn-back control in MIG welding. A switch 106c is connected across terminals i and j of circuit 98 to disable the phase angle monitoring function of circuit 98. Switches 106a, 106b and 106c may be ganged so that switch 106a is closed when switches 106b and 106c are opened (the status shown in FIG. 3), and vice versa. Switch 106a is opened and switches 106b and 106c are closed when MIG welding. Also, negative DC terminal 75 is often used during MIG welding since a lower inductance level is often required during MIG welding.

Mixing circuit 58 includes terminals k and l connected to shunt 50 through an isolation transformer 105. Shunt 50 supplies a voltage signal to circuit 58 proportional to the current through shunt 50. Terminals m and n of mixing circuit 58 monitor the voltage across lines 38, 42. Circuit 58 mixes these signals, typically using a conventional voltage divider network, in various proportions according to the position of variable resistor 108. This permits the output of power supply 2 to be regulated from constant voltage (useful for MIG welding), see FIG. 4, to constant current (for TIG and stick welding, among others), see FIG. 5, or anywhere in between.

This mixed feedback signal feature, called the arc force feature, enables the operator to allow the current to vary upon a change in the arc length. For example, in pipeline welding the initial weld, known as the root pass, often encounters variation in the depth of the V-shaped groove cut in the abutting ends of the pipe segments. Changes in groove depth changes the required depth of penetration of the weld so more or less current is required. This can be accommodated in a controlled manner by the arc force feature. Thus, if the V-shaped groove depth decreases, which increases the required depth of weld penetration, the distance between the electrode tip and the bottom of the groove decreases causing the arc length to shorten. The shorter arc length decreases the arc resistance causing more current to be supplied to the electrode to insure full weld penetration at the joint.

Circuit 98 is provided power through a transformer 100 which transforms voltage from terminal posts 88, 90. Fire control circuit 98 is of conventional design and preferably includes protection circuitry for non-process short circuiting of relatively long duration, such as can occur during UL testing. The firing control circuit shown in U.S. Pat. No. 3,912,980 to Crump, et al. and the model FPO-310 control circuit sold by Energy Research Associates of Campbell, Calif. are examples of such circuits. Minor modifications may be made to these circuits, such as to rectify the AC signal from shunt 50 to a DC signal. Since the particular design of circuit 98 is not part of the invention, it will not be described in detail.

Rectifier circuit 60 is of conventional design and includes four diodes 101 and four protection capacitors 102 mounted in a full-wave bridge.

In the constant voltage mode, the reactance in the main circuit is very beneficial. Under a short circuiting condition, the feeback circuit turns the SCRs on to their full conduction angle since it is trying to maintain the arc voltage. With the SCRs on full conduction and a constant voltage with load resistance decreased toward zero, current could go to an unacceptably high level without additional circuit impedance and/or other circuit protection. The reactance helps to limit this current, thereby protecting the transformer, SCRs and diodes. Since the firing circuit turns the SCRs on to their full conduction angle under short circuit conditions, the portion of the firing circuit short circuit protection circuit that measures phase angle for the constant current mode (FIG. 3, leads a and b) is disabled, leaving the short circuit protection circuit to measure only current. The phase angle sensing is disabled using another set of poles on switch 106, connected to leads i and j on the firing circuit.

By placing current regulating circuit 44 between secondary winding 16, 18 and by mounting shunt 50 between windings 14, 18—SCRs 94, 95 and shunt 50 are effectively isolated from noise or interference present in the secondary circuit. Isolation transformer 105 isolates interferences in the output (secondary) side of power supply 2, particularly interference present in shunt 50, from circuits 58 and 98. This is particularly helpful in AC welding where there is no inductor to help filter out this noise. The secondary windings on either side of current regulation circuit 44 and shunt 50 thus serve a dual purpose of providing a step down voltage to the output terminals of the power supply and to filter noise from reaching these components. This filtering function is thus achieved without any special circuitry or additional components. Isolation of SCRs 94, 95 promotes their proper operation. The isolation of shunt 50 and circuit 44 also aids proper operation of power supply 2 by eliminating much of the noise which would otherwise be applied to firing control circuit 98.

The following example illustrates how using a small amount of reactance on the AC side of power supply 2 greatly enhances operating effectiveness of the power supply at a minimal price. Assume power supply 2 is a 300 amp power supply with 35 volts open circuit and is operating in an AC mode. The voltage drop at 300 amps through transformer 4 due to internal resistance is about 2 volts. Another 2 volt drop would typically occur through SCRs 94, 95, diodes 101 and the internal wiring for an operating voltage of 35−4=31 volts. The total internal resistance would be 4 volts/300 amps = 0.0133 ohms.

If reactance is now added which causes a reactive voltage drop equal to 5% of the open circuit voltage, the effect on the circuit impedance under a short circuited load condition is as follows:

Voltage drop at 300 amps from
reactance = 5% × 35 = 1.75 volts (reactive)

Voltage drop at 300 amps from internal resistance
= 4.00 volts (resistive)

Total voltage drop at 300 amps $(1.75^2+4.0^2)^{\frac{1}{2}}=4.37$ volts

The total impedance, Z, of this circuit is:
$Z=v/i=4.37/300=0.0146$ ohms.

The open circuit voltage of the transformer must therefore be increased by $(35^2+1.75^2)^{\frac{1}{2}}-35=0.04$ volts to 35.04 volts to still achieve the same 31 volts operating voltage at 300 amps as before. This is illustrated by curves 110 in FIGS. 4 and 5. (Regions 112 are the short circuited cut-off regions from the protective action of circuit breakers 87.) Thus, the open circuit voltage increase is approximately one tenth of one percent. This results in an insignificant increase in the KVA, size and cost of transformer 4.

The power factor (under short circuiting conditions) for this circuit is equal to the circuit resistance divided by the total circuit impedance (resistive +reactive) and is equal to $0.0133/0.0146=0.91$.

Figure 6:
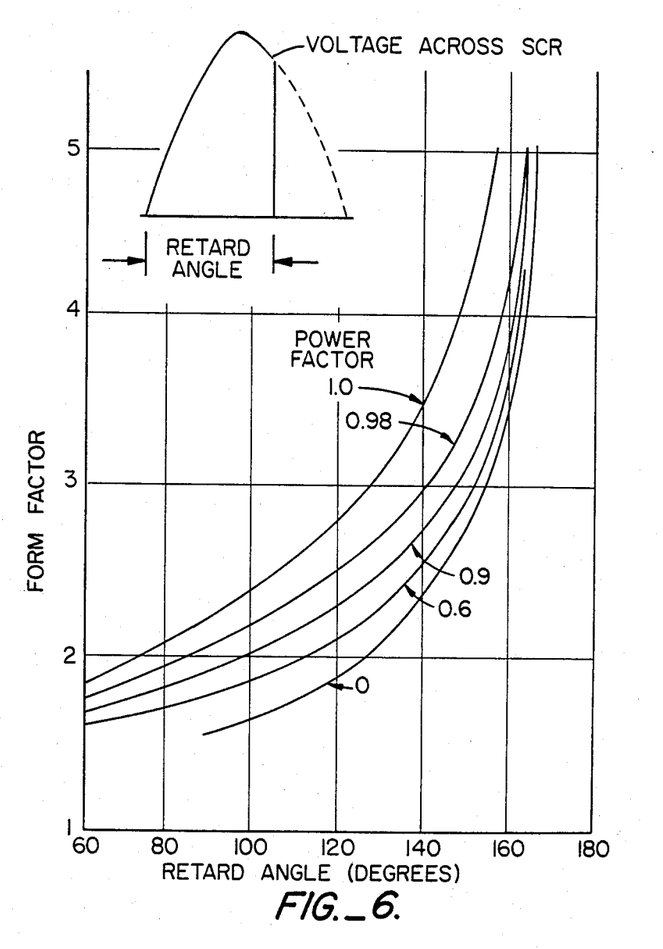
FIG. 6 is a graph plotting SCR form factor versus retard angle at different power factors.

FIG. 6, taken from page 242 of *General Electric SCR Manual,* Sixth Ed., 1979, shows that at the high retard angles (or low conduction angles) that would by typical of a short circuiting condition for an SCR regulated constant current power supply, the form factor improvement from the addition of this reactance is dramatic. For example, at a retard angle of 140° the circuit with no reactance (power factor $=1.0$) has a form factor of approximately 3.5. For the circuit with reactance (power factor $=0.91$) the form factor is approximately 2.7. Therefore, for a given average current, the RMS current for the circuit with reactance is $(1-2.7/3.5)\times100=23\%$ less than the circuit wwith no reactance. Therefore the addition of the small amount of reactance allows the SCR rating to decrease by 23% while requiring an insignificant increase in the open circuit voltage and transformer rating.

This improvement is even greater at retard angles above 140°, which is more typical of a short circuiting condition. For example, at a 150° retard angle the SCR rating can decrease 28%. This is a very favorable economic trade off. The reactance is easily achieved by decoupling the transformer secondary, or a portion thereof, from the primary. This can be done at minimal cost by simply rearranging the normal location of the windings.

The above example demonstrated the effect of reactance where the voltage drop from the reactance is equal to 5% of the open circuit voltage. In actual practice it has been found that the most effective range for this reactance is from 5% to 15%.

Figure 4:
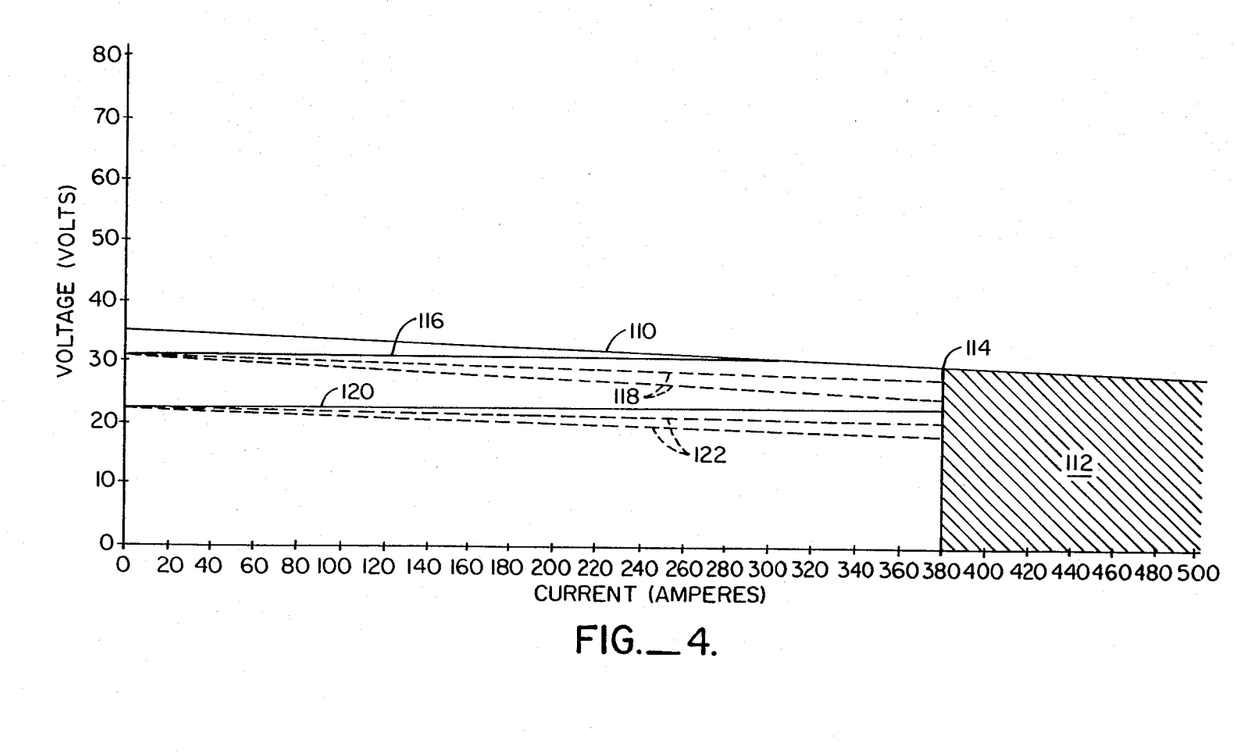
FIGS. 4 and 5 show typical plots of voltage versus current during constant voltage and constant current operations, respectively.

Referring now to FIG. 4, the voltage, current characteristics of power supply 2 when in a constant voltage mode, such as used for MIG welding, are shown. The drop from the open circuit voltage of 35.04 volts (from the above example) to 31 volts at position 114 due to internal resistance of power supply 2 is indicated by curve 110. The 31 volt operating voltage setting is indicated by constant voltage operating curve 116. Curve 116 is achieved by opening switch 106a, thus removing minimum current winding 20 from the circuit, closing switches 106b and 106c and adjusting control potentiometer 108 to provide firing control circuit 98 with a signal responsive to the voltage across lines 38, 42 irrespective of the current through shunt 50.

Dashed curves 118 show the output characteristics achieved through the arc force feature when control potentiometer is adjusted to provide firing control circuit 98 with a mixed feedback signal incorporating voltage signals from lines 38 and 42 and current signals from shunt 50. The output level of power supply 2 is changed by adjusting control resistor 99. A constant voltage operating curve 120 illustrates the output of power supply 2 at a constant voltage setting lower than the setting reflected by curve 116. Sloping curves 122 are, like curves 118, produced by adjusting control potentiometer 108 of mixing circuit 58 to produce a sloping voltage versus current curve.

Figure 5:
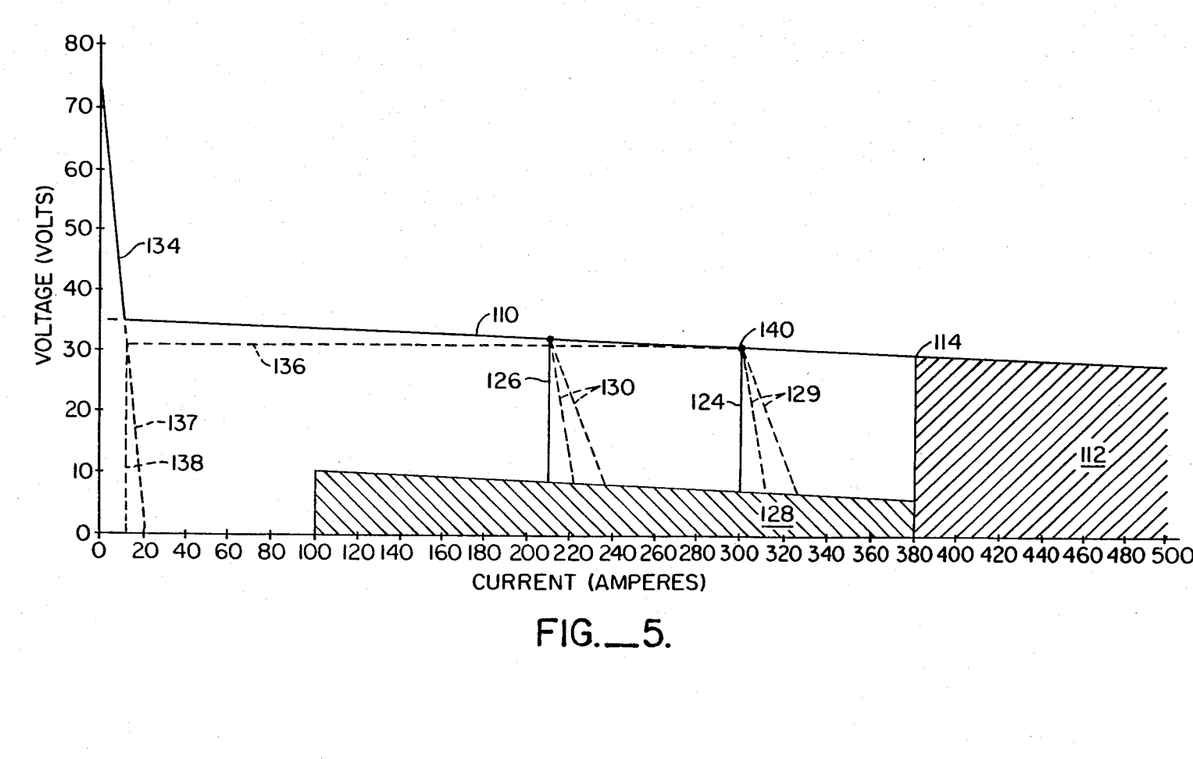

FIG. 5 illustrates the output of power supply 2 when in a constant current mode, such as used for stick and TIG welding, with switch 106a closed and switches 106b and 106c opened. Constant current operating curves 124, 126 illustrate the constant current operating range between curve 110 and a short circuit protection region 128. Region 128 is provided by firing control circuit 98 (by opening switch 106c) to help protect SCRs 94, 95 from current spikes caused by momentary short circuited conditions. The arc force feature is indicated by curves 129, 130. Curves 129, 130, like those in FIG. 4, are produced by adjusting potentiometer 108 of mixing circuit 58. Steeply sloping curve 134 reflects the inclusion of minimum current winding 20 in the circuit. The shape of curve 134 results from the use of resistor 104 to limit the current.

Curves 134, 110 and either of constant current operating curves 124 or 126 make up the overall operating curve of power supply 2 when in the constant current mode. As indicated by dashed lines 136, 137 and 138, the current from minimum current winding 20 when power supply 2 is being operated along curve 124 at point 140 is about 10 amperes. Thus, most of the current comes from secondary windings 14, 16 and 18.

Modification and variation can be made to the disclosed embodiment without departing from the subject of the invention as defined in the following claims.

I claim:

1. A welding power supply comprising:
a main transformer including a primary winding and first and second secondary windings, said first and second secondary windings connected in series, each said first and second secondary windings having first and second output terminals;
the first output terminal of said first secondary winding being electrically connected to a first AC supply terminal and the second output terminal of said second secondary winding electrically connected to a second AC supply terminal;
a current regulating circuit;
means for electrically connecting said current regulating circuit between the second terminal of said first secondary winding and the first terminal of said second secondary winding thereby aiding isolation of said current regulating circuit from electrical interference;
means for sensing electrical output of said secondary windings; and
control circuit means, electrically connected to said current sensing means, for controlling the operation of said current regulating circuit to regulate the electrical output of the power supply.

2. The power supply of claim 1 further comprising a rectifier circuit including first and second rectifier input terminals electrically connected to said first and second output terminals of said first and second secondary windings respectively, said rectifier circuit having first and second rectifier output terminals electrically connected to first and second DC supply terminals whereby the power supply can supply AC or DC.

3. The power supply of claim 2 wherein said AC and DC supply terminals are separate terminals.

4. The power supply of claim 1 further comprising a reactor electrically positioned between said primary winding and at least one of said AC supply terminals, said reactor sized to provide a relatively small amount of reactance to the power supply.

5. The power supply of claim 4 wherein said reactance is provided by at least one of said secondary windings being partially electromagnetically decoupled from said primary winding.

6. The power supply of claim 4 wherein the relatively small amount of reactance provides a voltage drop during use equal to between about 5% to 15% of the voltage between the first output terminal of said first secondary winding and the second output terminal of said second secondary winding when the current through said second secondary winding is about zero.

7. The power supply of claim 1 further comprising a third secondary winding electrically connected between said first secondary winding and said second secondary winding.

8. The power supply of claim 7 wherein said current regulating circuit is electrically connected between said second secondary winding and said third secondary winding.

9. The power supply of claim 7 wherein said electrical output sensing means includes a low resistance shunt electrically connected between said first secondary winding and said third secondary winding to sense the current through said first secondary winding.

10. The power supply of claim 9 further comprising electrical isolation means electrically connected between the low resistance shunt and the electrical output sensing means.

11. The power supply of claim 10 wherein said electrical isolation means includes an isolation transformer.

12. The power supply of claim 7 wherein said electrical output sensing means includes means for sensing the voltage across said first and second secondary windings.

13. The power supply of claim 1 wherein said electrical output sensing means includes means for sensing the voltage across at least one of said secondary windings.

14. The power supply of claim 1 wherein said electrical output sensing means includes current sensor means for monitoring the current through the secondary windings, a voltage sensor means for monitoring the voltage across at least one of said secondary windings and mixing circuit means, operably coupled to said current and voltage sensor means, for providing an adjustably mixed current and voltage level signal to said control circuit means.

15. The power supply of claim 1 further comprising a minimum current source means, electrically connected in parallel with said first and second secondary windings, for providing a source of electrical current at an elevated voltage relative to the voltage across said first and second secondary windings.

16. The power supply of claim 15 wherein said minimum current source means includes a minimum current secondary winding.

17. The power supply of claim 15 further comprising safety switch means for electrically connecting said minimum current source means to said first output terminal of said first secondary winding in response to current flow through said secondary windings.

18. A welding power supply comprising:
a main transformer including a primary winding and first and second secondary winding, said first and second secondary windings connected in series, each said first and second secondary windings having first and second output terminals;
at least one of said secondary windings being partially electromagnetically decoupled from said primary winding to provide a relatively small amount of reactance to the power supply to produce a voltage drop during use equal to between about 5% to 15% of the voltage across said secondary windings when the current through said second secondary winding is about zero;
the first output terminal of said first secondary winding being electrically connected to a first AC supply terminal and the second output terminal of said second secondary winding electrically connected to a second AC supply terminal;
a minimum current secondary winding, electrically connected in parallel with said secondary windings, for providing a source of electrical current at an elevated voltage relative to the voltage across said first and second secondary windings;
a current regulating circuit;
means for electrically connecting said current regulating circuit between said first secondary winding and said second secondary winding thereby aiding isolation of said current regulating circuit from electrical interference;
a rectifier circuit including first and second rectifier input terminals electrically connected to said first and second output terminals of said first and second secondary windings, respectively, said rectifier circuit having first and second rectifier output terminals electrically connected to first and second DC supply terminals;
means for sensing current flow through and voltage drop across at least one of said secondary windings;
adjustable mixing circuit means, electrically connected to said sensing means, for creating a mixed current/voltage signal; and
control circuit means, electrically connected to said adjustable mixing circuit means, for controlling the operation of said current regulating circuit to regulate the current flow through said secondary windings according to said mixed current/voltage signal.

* * * * *